(12) United States Patent
Kojima

(10) Patent No.: US 7,738,475 B2
(45) Date of Patent: Jun. 15, 2010

(54) INFORMATION PROCESSING APPARATUS, METHOD, AND PROGRAM

(75) Inventor: Toshiaki Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 519 days.

(21) Appl. No.: 11/682,506

(22) Filed: Mar. 6, 2007

(65) Prior Publication Data

US 2007/0217445 A1    Sep. 20, 2007

(30) Foreign Application Priority Data

Mar. 17, 2006 (JP) ............................. 2006-074713

(51) Int. Cl.
*H04L 12/56* (2006.01)
*H04J 1/16* (2006.01)
(52) U.S. Cl. .................... 370/419; 370/252; 370/467
(58) Field of Classification Search ............ 370/395.53, 370/419, 252, 467
See application file for complete search history.

(56) References Cited

U.S. PATENT DOCUMENTS 6,161,161 A * 12/2000 Botkin et al. ............... 710/313
7,313,643 B2 * 12/2007 Sakurai et al. .............. 710/315
2008/0109577 A1 * 5/2008 Azevedo et al. ............ 710/51

FOREIGN PATENT DOCUMENTS

| JP | 10-254819 | 9/1998 |
| JP | 2000-172632 | 6/2000 |
| JP | 2003-274326 | 9/2003 |
| JP | 2004-280364 | 10/2004 |

* cited by examiner

*Primary Examiner*—John Pezzlo
(74) *Attorney, Agent, or Firm*—Oblon, Spivak, McClelland, Maier & Neustadt, L.L.P.

(57) ABSTRACT

Disclosed herein is an information processing apparatus including, one or more modules that are interconnected via a system bus, wherein each of one or more the modules includes, a functional device, which conforms to a local interface that differs from an interface for the system bus, and performs a predetermined function, and an interface device, which is connected to the functional device via a local bus conforming to the local interface, and connected to another module via the system bus, wherein, when information in a first format conforming to the local interface is supplied from the functional device via the local bus, the interface device converts the information from the first format to a second format conforming to the interface for the system bus and supplies the converted information to the another module via the system bus, and wherein, when information in the second format is supplied from the another module via the system bus, the interface device converts the information from the second format to the first format and supplies the converted information to the functional device via the local bus.

8 Claims, 7 Drawing Sheets

INFORMATION PROCESSING APPARATUS, METHOD, AND PROGRAM

CROSS REFERENCES TO RELATED APPLICATIONS

The present invention contains subject matter related to Japanese Patent Application JP 2006-074713 filed in the Japanese Patent Office on Mar. 17, 2006, the entire contents of which being incorporated herein by reference.

BACKGROUND OF THE INVENTION

1. Field of the Invention

The present invention relates to an information processing apparatus, method, and program, and more particularly to an information processing apparatus, method, and program that are capable of reducing the degree of dependence of a module on a general-purpose bus.

2. Description of the Related Art

In recent years, a PCI (Peripheral Component Interconnect) (trademark) bus, PCI Express (trademark) bus, and various other general-purpose buses have been proposed. Various modules that are designed in compliance with bus interfaces for such general-purpose buses are now readily available. There are an increasing number of cases where an information processing apparatus (an apparatus disclosed, for instance, by Japanese Patent Laid-open No. 2003-274326) is commercialized by combining a module purchased from a third party with a proprietarily developed module while using the above-mentioned general-purpose buses as a backbone.

When a product is designed in the above manner, the designer of the product can achieve commercialization with high efficiency because resources can be concentrated on the development of new modules.

SUMMARY OF THE INVENTION

In the above case, the proprietarily developed module also conforms to an interface for a general-purpose bus. However, the technologies for general-purpose buses drastically change so that their trend varies at short intervals. Further, third-party modules are developed in accordance with a trend in general-purpose buses. Therefore, the interface for the proprietarily developed module needs to be remade in accordance with the trend.

In other words, previously developed modules greatly depend on a general-purpose bus. Therefore, when the trend in the general-purpose bus changes, many parts of the previously developed modules need to be modified or newly designed.

The present invention has been made under the above circumstances and provides an information processing apparatus, method, and program that are capable of reducing the degree of dependence of a module on a general-purpose bus.

A first information processing apparatus according to an embodiment of the present invention includes one or more modules that are interconnected via a system bus. Each module includes a functional device, which conforms to a local interface that differs from an interface for the system bus, and performs a predetermined function; and an interface device, which is connected to the functional device via a local bus conforming to the local interface, and connected to another module via the system bus. When information in a first format conforming to the local interface is supplied from the functional device via the local bus, the interface device converts the information from the first format to a second format conforming to the interface for the system bus and supplies the converted information to the other module via the system bus. When information in the second format is supplied from the other module via the system bus, the interface device converts the information from the second format to the first format and supplies the converted information to the functional device via the local bus.

A first information processing method and first program according to an embodiment of the present invention are the information processing method and program for the first information processing apparatus according to an embodiment of the present invention.

The first information processing apparatus, method, and program according to an embodiment of the present invention relate to an information processing apparatus in which one or more modules are interconnected via a system bus. More specifically, each module includes a functional device, which conforms to a local interface that differs from an interface for the system bus, and performs a predetermined function; and an interface device, which is connected to the functional device via a local bus conforming to the local interface, and connected to another module via the system bus. The first information processing apparatus, method, and program according to an embodiment of the present invention relate to the interface device. When information in a first format conforming to the local interface is supplied from the functional device via the local bus, the interface device converts the information from the first format to a second format conforming to the interface for the system bus and supplies the converted information to the other module via the system bus. When, on the other hand, information in the second format is supplied from the other module via the system bus, the interface device converts the information from the second format to the first format and supplies the converted information to the functional device via the local bus.

A second information processing apparatus according to an embodiment of the present invention is connected to a system bus and to a local bus conforming to a local interface, which differs from an interface for the system bus. When information in a first format conforming to the local interface is supplied from the local bus, the information is converted from the first format to a second format conforming to the interface for the system bus and supplied to the system bus. When information in the second format is supplied from the system bus, the information is converted from the second format to the first format and supplied to the local bus.

The information processing apparatus described above includes a storage that is connected to the local bus and configured to store information in the first format; and a converter that is connected to the system bus and configured to convert information format between the first format and the second format.

The local bus described above includes a message bus for transmitting a message and a data bus for transmitting data. The storage includes a message storage that is connected to the message bus and configured to store the message in the first format, and a data storage that is connected to the data bus and configured to store the data in the first format. The converter converts the format of the message or the data between the first format and the second format.

The system bus described above is a PCI (Peripheral Component Interconnect) Express bus. The second format described above is a TLP (Transaction Layer Packet).

A second information processing method and second program according to an embodiment of the present invention are the information processing method and program for the second information processing apparatus according to an embodiment of the present invention.

When the second information processing apparatus, method, and program according to an embodiment of the present invention are used, information is transmitted as described below between a system bus and a local bus conforming to a local interface, which differs from an interface for the system bus. When information in a first format conforming to the local interface is supplied from the local bus, the information is converted from the first format to a second format conforming to the interface for the system bus and supplied to the system bus. When, on the other hand, information in the second format is supplied from the system bus, the information is converted from the second format to the first format and supplied to the local bus.

As described above, the present invention implements a method of interconnecting one or more modules via a system bus. The use of such a method makes it possible to reduce the degree of dependence of modules on the system bus.

DETAILED DESCRIPTION OF THE PREFERRED EMBODIMENT

An embodiment of the present invention will now be described. The relationship between constituent features indicated by the appended claims and specific examples described in this document or depicted in the accompanying drawings is exemplified below. This statement verifies that the specific examples supporting the invention described in the claims are described in this document or depicted in the accompanying drawings. Therefore, even if a specific example is not described here as a specific example that corresponds to the constituent features although the specific example is described in this document or depicted in the accompanying drawings, it does not mean that the specific example does not correspond to the constituent features. Conversely, even if the specific example is described here as a specific example that corresponds to the constituent features, it does not mean that the specific example does not correspond to the other constituent features.

Further, the following description does not signify that the invention corresponding to the specific examples described in this document or depicted in the accompanying drawings is entirely described in the claims. In other words, the following description does not deny the presence of an invention that corresponds to the specific examples described in this document or depicted in the accompanying drawings but is not indicated by the claims, that is, the description does not deny the presence of an invention that may be filed in the future for divisional patent application or for addition to the present patent application as a result of later amendment to the claims.

Figure 1:
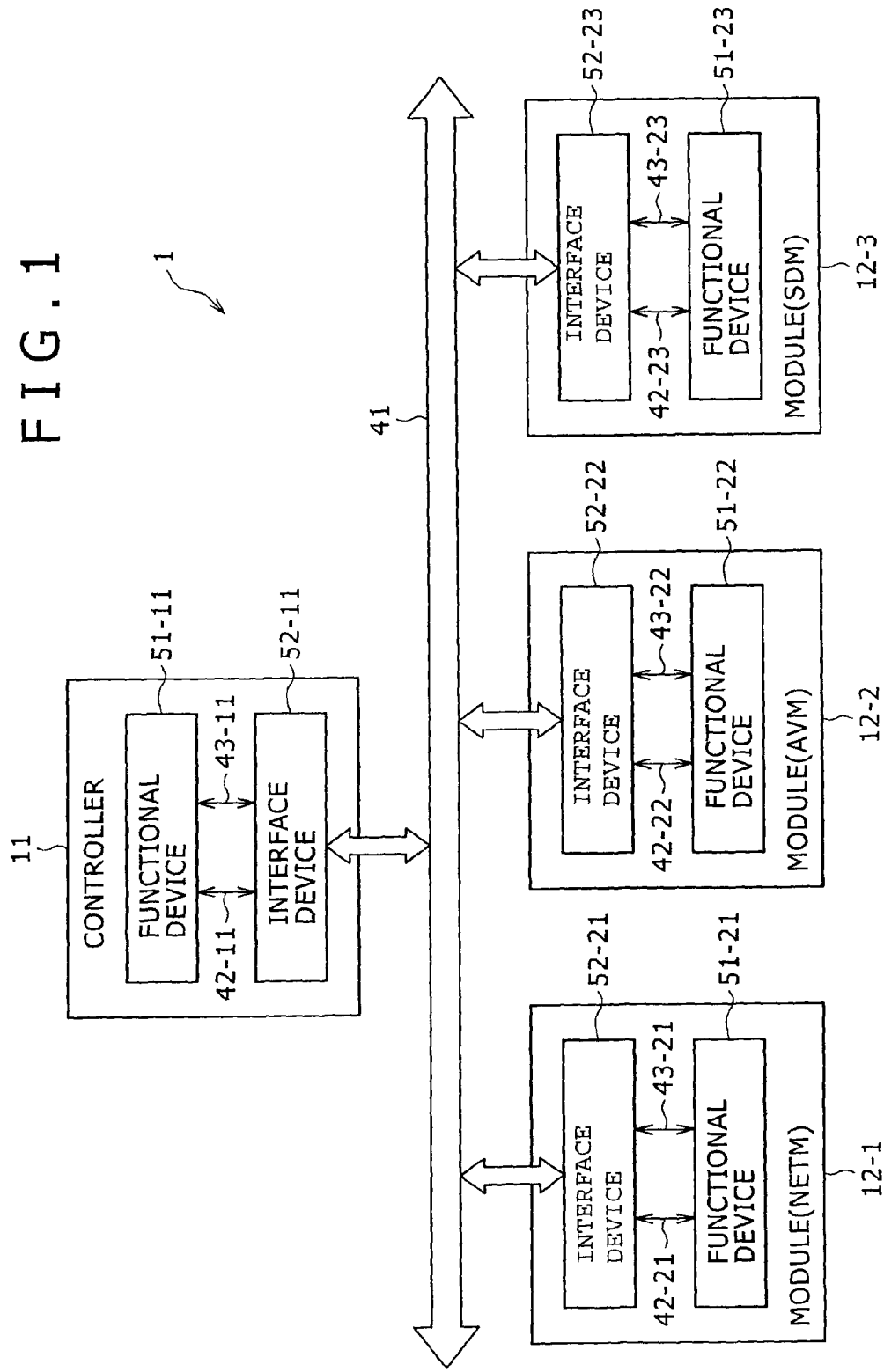
FIG. 1 is a block diagram illustrating a typical hardware configuration of an information processing apparatus according to an embodiment of the present invention.

A first information processing apparatus (e.g., an information processing apparatus 1 in FIG. 1) according to an embodiment of the present invention includes one or more modules (e.g., a controller 11, an NETM 12-1, an AVM 12-2, and an SDM 12-3 in FIG. 1) that are interconnected via a system bus (e.g., a general-purpose system bus 41 in FIG. 1). Each module includes a functional device, which conforms to a local interface that differs from an interface for the system bus, and performs a predetermined function (e.g., functional devices 51-11, 51-21, 51-22, 51-23 in FIG. 1); and an interface device (e.g., an interface device 52-11, 52-21, 52-22, or 52-23), which is connected to the functional device via a local bus (e.g., a combination of a message bus 42-11 and a data bus 43-11 in FIG. 1, a combination of a message bus 42-21 and a data bus 43-21 in FIG. 1, a combination of a message bus 42-22 and a data bus 43-22 in FIG. 1, or a combination of a message bus 42-23 and a data bus 43-23 in FIG. 1) conforming to the local interface, and connected to another module via the system bus. When information in a first format conforming to the local interface is supplied from the functional device via the local bus, the interface device converts the information from the first format to a second format conforming to the interface for the system bus and supplies the converted information to the other module via the system bus. When information in the second format is supplied from the other module via the system bus, the interface device converts the information from the second format to the first format and supplies the converted information to the functional device via the local bus.

A first information processing method and first program according to an embodiment of the present invention are the information processing method and program for the first information processing apparatus according to an embodiment of the present invention.

Figure 4:
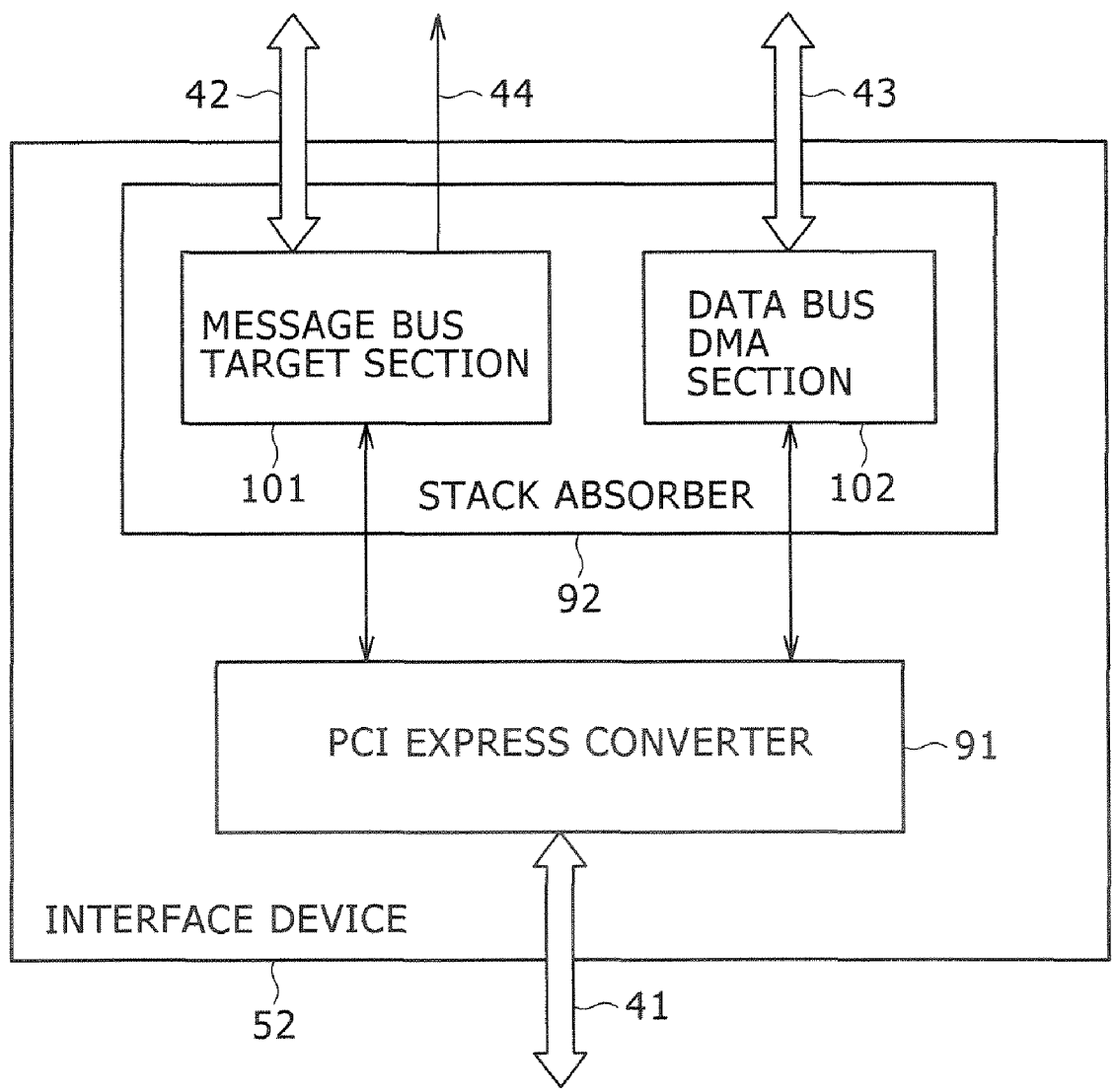
FIG. 4 is a block diagram illustrating in detail a typical hardware configuration of an interface device for the information processing apparatus, which is shown in FIG. 1.

A second information processing apparatus (e.g., an interface device 52 in FIG. 4) according to an embodiment of the present invention is connected to a system bus (e.g., a general-purpose system bus 41 in FIG. 4) and to a local bus (e.g., a combination of a message bus 42 and a data bus 43 in FIG. 4) conforming to a local interface, which differs from an interface for the system bus. When information in a first format conforming to the local interface is supplied from the local bus, the information is converted from the first format to a second format conforming to the interface for the system bus and supplied to the system bus. When information in the second format is supplied from the system bus, the information is converted from the second format to the first format and supplied to the local bus.

The information processing apparatus described above includes a storage (e.g., a stack absorber 92 in FIG. 4) that is connected to the local bus and configured to store information in the first format; and a converter (e.g., a PCI Express converter 91 in FIG. 4) that is connected to the system bus and configured to convert information format between the first format and the second format.

The local bus described above includes a message bus (e.g., a message bus 42 in FIG. 4) for transmitting a message and a data bus (e.g., a data bus 43 in FIG. 4) for transmitting data. The storage includes a message storage (e.g., a message bus target section 101 in FIG. 4) that is connected to the message bus and configured to store the message in the first format, and a data storage (e.g., a data bus DMA section 102 in FIG. 4) that is connected to the data bus and configured to store the data in the first format. The converter converts the format of the message or the data between the first format and the second format.

A second information processing method and second program according to an embodiment of the present invention are the information processing method and program for the second information processing apparatus according to an embodiment of the present invention.

An embodiment of the present invention will now be described with reference to the accompanying drawings.

FIG. 1 shows an example illustrating the configuration of an information processing apparatus according to an embodiment of the present invention.

The example in FIG. 1 indicates that the information processing apparatus 1 includes a controller 11 and modules 12-1, 12-2, 12-3. These four modules (including the controller 11) are interconnected via a general-purpose system bus 41.

Each module is a unit of elemental technology for designing the basic structure of a product (the information processing apparatus 1 in the present embodiment). The designer or other relevant personnel may freely define what technological levels that the elemental technology includes. In other words, when the basic structure of a product is to be designed, the designer or other relevant personnel should uniquely determine the functions to be incorporated into the product and use user's discretion in classifying the functions into the categories of one or more elemental technologies. As regards a module corresponding to a predetermined elemental technology, the designer or other relevant personnel should carry out design and production work so that the module incorporates the functions classified into the category of the predetermined elemental technology.

In the example in FIG. 1, the modules are configured (designed and produced) as described below.

Figure 3:
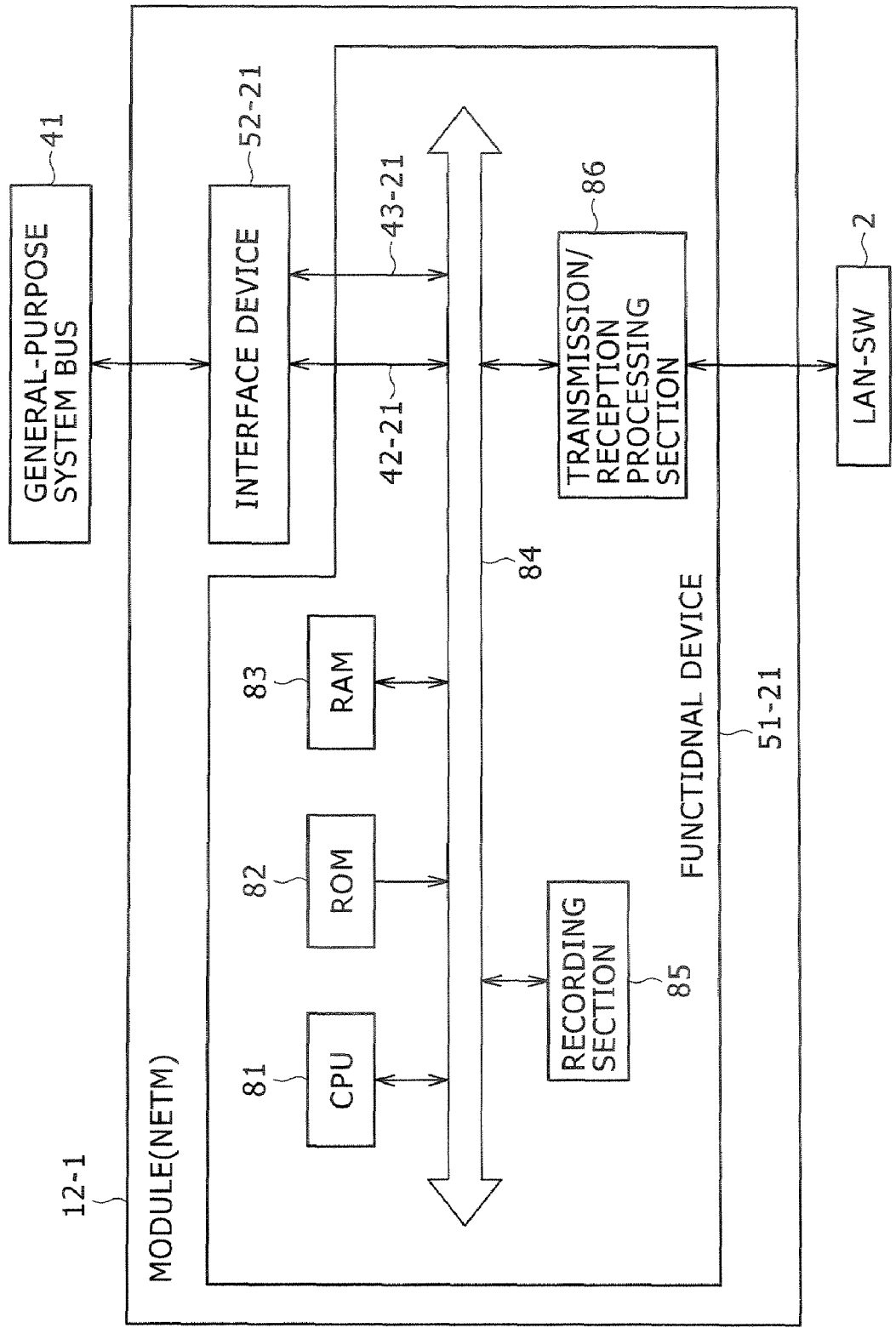
FIG. 3 is a block diagram illustrating in detail a typical hardware configuration of a functional device in an NETM for the information processing apparatus, which is shown in FIG. 1.

The module 12-1 is configured as a network device module (hereinafter referred to as the NETM). The NETM is a module that exercises network functions, that is, incorporates various functions for communicating with another information processing apparatus (not shown) via a LAN-SW 2 (FIG. 3).

The module 12-2 is configured as an audio and visual device module (hereinafter referred to as the AVM) The AVM is a module that performs AV recording/reproducing operations, that is, performs various AV signal processing operations such as encoding AV signals and decoding encoded AV signals.

The module 12-3 is configured as a storage device module (hereinafter referred to as the SDM). The SDM is a module that controls a hard disk drive, optical disk, tape, or other storage device, that is, incorporates functions, for instance, for performing data read/data write operations on a storage device.

The controller 11 is also a module that exercises overall control over the information processing apparatus 1.

The example in FIG. 1 indicates that the information processing apparatus 1 includes four modules. However, the number of modules included in the information processing apparatus 1 is not limited to the example shown in FIG. 1.

In the present embodiment, the general-purpose system bus 41 is configured as a PCI Express bus. It goes without saying that a PCI or other general-purpose bus may be employed as the general-purpose system bus 41. In such a case, however, each module is provided with an interface device that is suitable for the employed general-purpose bus, as described later.

The four modules, namely, the controller 11, NETM 12-1, AVM 12-2, and SDM 12-3, will be described below.

The controller 11 includes a functional device 51-11 and an interface device 52-11. These devices are interconnected via a message bus 42-11 and a data bus 43-11.

The modules 12-1 to 12-3 are configured basically the same as the controller 11. More specifically, the module 12-1 includes a functional device 51-21 and an interface device 52-21, which are interconnected via a message bus 42-21 and a data bus 43-21; the module 12-2 includes a functional device 51-22 and an interface device 52-22, which are interconnected via a message bus 42-22 and a data bus 43-22; and the module 12-3 includes a functional device 51-23 and an interface device 52-23, which are interconnected via a message bus 42-23 and a data bus 43-23.

When the functional devices 51-11, 51-21, 51-22, and 51-23 need not be distinguished from each other, they will be generically referred to as a functional device 51. Similarly, when the interface devices 52-11, 52-21, 52-22, and 52-23 need not be distinguished from each other, they will be generically referred to as an interface device 52. Accordingly, the message buses 42-11, 42-21, 42-22, and 42-23 will be generically referred to as a message bus 42; and the data buses 43-11, 43-21, 43-22, and 43-23 will be generically referred to as a data bus 43.

Namely, each module in the present embodiment includes a functional device 51 and an interface device 52, which are interconnected via a message bus 42 and a data bus 43.

As the interface for the functional device 51 and interface device 52, a local interface having the message bus 42 and data bus 43 is employed. In other words, the message bus 42 and data bus 43 are local buses that conform to such a local interface.

Therefore, it is simply satisfied that each functional device 51 conform to the above-mentioned local interface. Configuration can be achieved without paying attention to PCI Express.

The message bus 42 is configured, for instance, as a 32-bit SRAM/SSRAM compatible target. It is designed on the presumption that it is connected to a CPU. In the present embodiment, therefore, messages (see FIG. 5) exchanged between the CPUs for the functional devices 51 are transmitted by the message bus 42.

On the other hand, the data bus 43 is configured as a 64-bit DMA master/target. It is designed on the presumption that it is connected to hardware. Therefore, when, in the present embodiment, various settings are defined by messages exchanged between the CPUs for the functional devices 51, data (e.g., AV data) exchanged between various units of hardware for the functional devices 51 is transmitted by the data bus 43.

In other words, the message bus 42 operates as if the CPUs for the functional devices are connected via a DPRAM, and the data bus 43 operates as if various units of hardware for the functional devices are directly coupled by means of DMA.

The functional device 51 conforming to the local interface as described above can be configured as described below.

Figure 2:
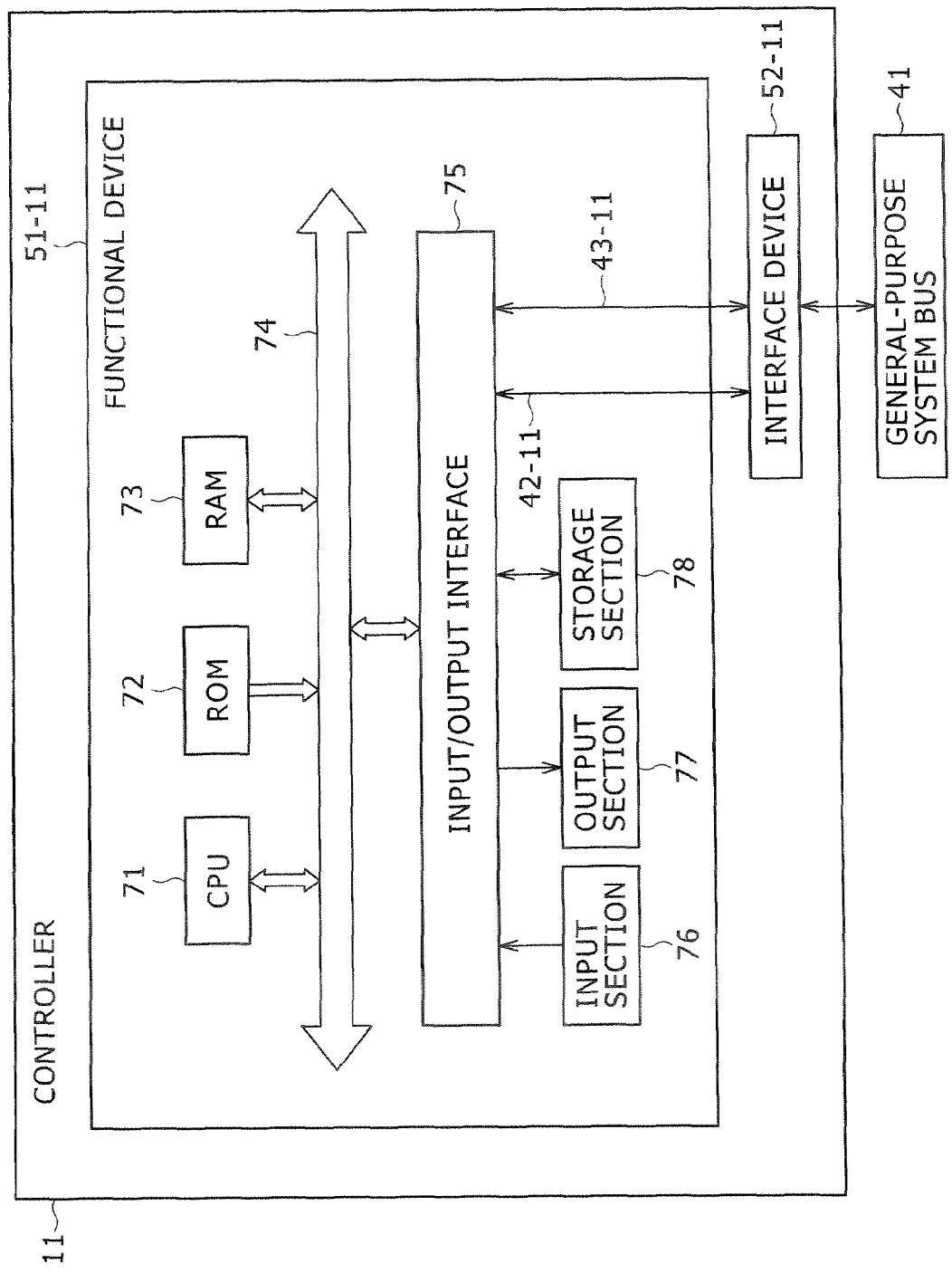
FIG. 2 is a block diagram illustrating in detail a typical hardware configuration of a functional device in a controller for the information processing apparatus, which is shown in FIG. 1.

For example, a functional device 51-11 for the controller 11 can be configured as shown in FIG. 2.

In the functional device 51-11 shown in the example in FIG. 2, a CPU (Central Processing Unit) 71 performs various processes in accordance with a program stored in an ROM (Read Only Memory) 72 or with a program that is loaded into a RAM (Random Access Memory) 73 from a storage section 78. The RAM 73 also stores as needed the data that is required when the CPU 71 performs various processes.

The CPU 71, ROM 72, and RAM 73 are interconnected via a bus 74. The bus 74 is also connected to an input/output interface 75.

The input/output interface 75 is connected to an input section, which includes, for instance, a keyboard and a mouse; an output section, which includes, for instance, a display; and a storage section 78, which includes, for instance, a hard disk.

The input/output interface 75 is also connected to the interface device 52-11 via the message bus 42-11 and data bus 43-11. In other words, the input/output interface 75 conforms to the above-mentioned local interface.

The interface device 52-11 will be described in detail later with reference to FIG. 4.

In the present embodiment, the module 12-1 is configured as the NETM. Therefore, the functional device 51-21 can be configured as shown in FIG. 3.

The functional device 51-21 shown in the example in FIG. 3 receives information (data and messages) from the general-purpose system bus 41 via the interface device 52-21 and transmits it to another information processing apparatus (not shown) via the LAN-SW 2 or receives information from another information processing apparatus and supplies it to the general-purpose system bus 41 via the interface device 52-21. The functional device 51-21 also performs TCP/IP (Transmission Control Protocol/Internet Protocol) or other protocol stack processing (a predetermined process concerning a protocol stack).

The functional device 51-21 includes a CPU 81, a ROM 82, a RAM 83, a recording section 85, and a transmission/reception processing section 86. The CPU 81, ROM 82, RAM 83, recording section 85, and transmission/reception processing section 86 are interconnected via a bus 84.

The CPU 81 performs various processes in accordance with a program stored in the ROM 82 or with a program that is loaded into the RAM 83 form the recording section 85. The RAM 83 also stores as needed the data that is required when the CPU 81 performs various processes.

Under the control of the CPU 81, the transmission/reception processing section 86 performs, for instance, a predetermined process for transmitting information to another information processing apparatus (not shown) via the LAN-SW 2 or receiving information from another information processing apparatus (not shown) via the LAN-SW 2.

The bus 84 is also connected to the interface device 52-21 via the message bus 42-21 and data bus 43-21. In other words, the bus 84 conforms to the aforementioned local interface.

As described above, the functional device 51-21 conforms to the local interface for communicating with the interface device 52-21, and has a hardware configuration that is necessary for allowing the module 12-1 to function as the NETM.

Similarly, the functional device 51-22 for the module 12-2 shown in FIG. 1, which is not depicted in a figure, conforms to the local interface for communicating with the interface device 52-22, and has a hardware configuration that is necessary for allowing the module 12-2 to function as the AVM. Further, the functional device 51-23 for the module 12-3, which is not depicted in a figure, also conforms to the local interface for communicating with the interface device 52-23, and has a hardware configuration that is necessary for allowing the module 12-3 to function as the SDM.

As described above, the functional device 51 for each module is designed in conformity with the local interface (the local interface having the message bus 42 and data bus 43). Therefore, even when the general-purpose system bus 41 is changed to a bus other than a PCI Express bus, the intended purpose is achieved simply by changing only the interface device 52 that is commonly used by each module. In other words, each functional device 51 need not be changed at all.

FIG. 4 shows an example illustrating how the interface device 52 is configured when a PCI Express bus is employed as the general-purpose system bus 41.

The example in FIG. 4 indicates that the interface device 52 includes a PCI Express converter 91 and a stack absorber 92.

The PCI Express converter 91 is connected to the PCI Express bus, which serves as the general-purpose system bus 41, and to the stack absorber 92. In other words, the PC Express converter 91 of one module is connected to the PCI Express converter 91 of another module via the PCI Express bus (general-purpose system bus 41).

The stack absorber 92 includes a message bus target section 101 and a data bus DMA section 102.

The message bus target section 101 is not only connected to the aforementioned PCI Express converter 91, but also connected to the functional device 51 (the CPU in the functional device) of the local module via the message bus 42 and an interrupt line 44. The interrupt line 44 will be described later.

The data bus DMA section 102 is not only connected to the aforementioned PCI Express converter 91, but also connected to the functional device 51 (the hardware in the functional device) of the local module via the data bus 43.

A typical operation of the interface device 52 that is configured as described above will now be described.

For example, when a message is output from the functional device 51 of the local module, it is written on the message bus target section 101 via the message bus 42 in a format that conforms to the message bus 42.

Figure 5:
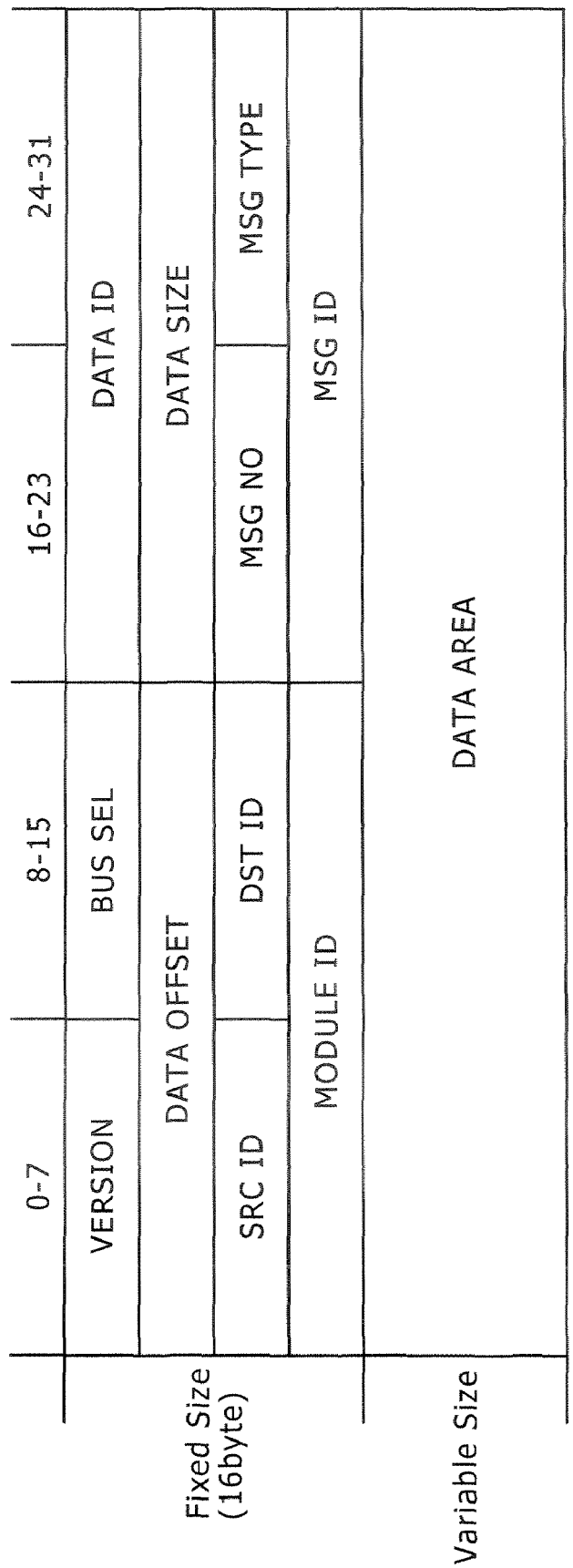
FIG. 5 shows a typical structure of a message that is transmitted on a message bus, which is shown in FIG. 4 and other figures.

For example, the message conforming to the message bus 42 may be in a format that is shown in FIG. 5.

FIG. 5 shows an example in which the message includes a header area (the area shown to the right of "Fixed Size (16-byte)" in the figure) that is composed of the first 16 bytes, and a data area (the area marked "DATA AREA" and shown to the right of "Variable Size" in the figure) in which variable-size data is written.

The header area includes various areas that are, from the beginning to the end, named "VERSION," "BUS SEL," "DATA ID," "DATA OFFSET," "DATA SIZE," "SRC ID," "DST ID," "MSG NO," "MSG TYPE," "MODULE ID," and "MSG ID."

In the VERSION area, a message protocol version is written. More specifically, a major version is written in the four least significant bit positions, whereas a minor version is written in the four most significant bit positions.

In the BUS SEL area, data storage in a message is written. More specifically, if, for instance, the value "1" is written in the first bit position, it means that data is attached to the message. If, for instance, the value "1" is written in the last bit position, it means that the rest of the data follows.

In the DATA ID area, a data ID is written. In the case of the NETM 12-1 (FIG. 1), a socket descriptor number is written.

The DATA OFFSET area is used to write a data leading offset, that is, an offset (in bytes) between the beginning of a message and the beginning of data.

In the DATA SIZE area, data size (in bytes) is written.

The SRC ID area is used to write a message transmission source ID, that is, an ID attached to a message transmission source module (an ID attached at the time of initialization).

The DST ID area is used to write a message transmission destination ID, that is, an ID attached to a message transmission destination module (an ID attached at the time of initialization).

The MSG NO area is used to write a number that identifies a message when a plurality of messages are issued to the same module.

In the MSG TYPE area, the type of a message is written. More specifically, if, for instance, the value "00" is written, it means that the message is a "command." If the value "01" is written, it means that the message is a "command response." If the value "02" is written, it means that the message is a "data request." If the value "03" is written, it means that the message is a "data report." If the value "04" is written, it means that the message is an "error/warning report." If the value "05" is written, it means that the message is an "event report." If the value "06" is written, it means that the message is a "log request." If the value "07" is written, it means that the message is a "log report."

The MODULE ID area is used to write a module ID that indicates the attribution of a message ID written in the MSG ID area, which follows. More specifically, the value "1" is written in the case of a common command. In the other cases, the ID of an associated module is written as the module ID.

The MSG ID area is used to write the ID of a message (a message ID). A combination of the message ID and module ID provides a unique ID.

The message to be written onto the message bus target section 101 shown in FIG. 4 in the format shown in FIG. 5 is supplied to the PCI Express converter 91. The PCI Express converter 91 then converts the data format of the message from the format shown in FIG. 5 to a format conforming to PCI Express (a format that permits transmission on the general-purpose system bus 41), and transmits the message to a transmission destination module (to the interface device 52 of the transmission destination module) via the general-purpose system bus 41, which serves as a PCI Express bus.

For example, the format conforming to PCI Express is a TLP (Transaction Layer Packet).

On the other hand, when data is output from the functional device 51 of the local module, it is written on the data bus DMA section 102 via the data bus 43 in a format that conforms to the data bus 43. The data written on the data bus DMA section 102 is supplied to the PCI Express converter 91. The PCI Express converter 91 then converts the format of the data from the format conforming to the data bus 43 to a TLP format or other format conforming to PCI Express, and transmits the data to a transmission destination module (to the interface device 52 of the transmission destination module) via the general-purpose system bus 41, which serves as a PCI Express bus.

As described above, the PCI Express converter 91 in the interface device 52 for the transmission destination module receives the data or message, as the data (e.g., a TLP) conforming to PCI Express, via the general-purpose system bus 41, which serves as a PCI Express bus.

The PCI Express converter 91 then judges in accordance with the address of the TLP whether the TLP is a message or data.

If the judgment result indicates that the TLP is data, the PCI Express converter 91 converts the TLP to data conforming to the data bus 43 and supplies the data to the data bus DMA section 102. The data bus DMA section 102 then supplies the data to the functional device 51 in the local module (transmission destination module) via the data bus 43.

If, on the other hand, the judgment result indicates that the TLP is a message, the PCI Express converter 91 converts the TLP to a message conforming to the message bus 42, for example, to a message structured as indicated in FIG. 5, and supplies the message to the message bus target section 101. The message bus target section 101 then supplies the message to the functional device 51 in the local module (transmission destination module) via the message bus 42.

The message bus 42 has a target function only. Therefore, when a message is output, the message bus target section 101 asserts an interrupt signal, which is supplied through the interrupt line 44, so that the functional device 51 in the local module performs a read via the message bus 42.

A data transfer from the interface device 52 in one module to the interface device 52 in another module is made via the PCI Express bus (general-purpose system bus 41).

Figure 6:
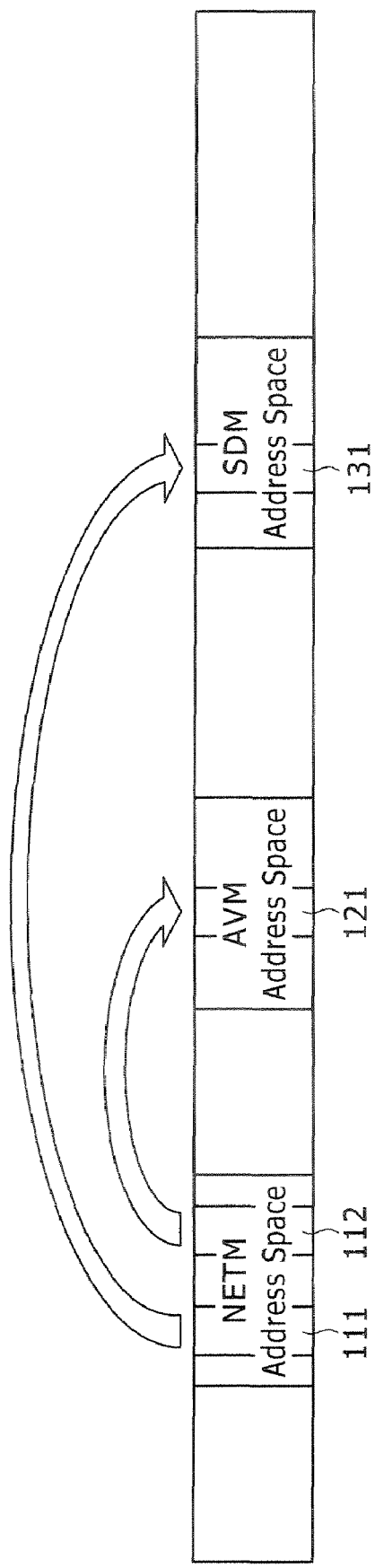
FIG. 6 illustrates the concept of data transfer operations that are performed between modules of the information processing apparatus shown in FIG. 1 via a system bus.

In the above instance, the data transfer is defined as a memory copy in a PCI address space as shown in FIG. 6. FIG. 6 shows an example of a PCI address space. The space marked "NETM Address Space" is an address space for the NETM 12-1. The space marked "AVM Address Space" is an address space for the AVM 12-2. The space marked "SDM Address Space" is an address space for the SDM 12-3. In the example shown in FIG. 6, the data in a memory space 112 of the NETM 12-1 is copied to a memory space 12-1 of the AVM 12-2, and the data in a memory space 111 of the NETM 12-1 is copied to a memory space 131 of the SDM 12-3.

Further, the data transfer is made to an address that is written as an argument for a transmission/reception request (e.g., send/recv request), which is included in a message handled via the message bus 42.

The PCI Express interface, which is described above, supports multiple data transfer.

Since the functional devices 51 are interconnected via the interface devices 52, which perform the above operation, the functional devices 51 perform the following operation.

The CPUs for the functional devices 51 exchange messages to determine the functional device 51 targeted for communication. In this instance, the CPUs for the functional devices 51 are handled by the message buses 42 as if they are connected via a DPRAM. From the viewpoint of the functional devices 51, therefore, messages are exchanged in a format that conforms to the message buses 42, that is, for instance, in a format that is structured as indicated in FIG. 5. In this instance, the communication destination can be determined in accordance with the contents of the header area shown in FIG. 5.

When the communication destination is determined as described above, the hardware in each functional device 51 exchanges data with the hardware in the functional device 51 at the communication destination. In this instance, each data bus 43 operates as if various units of hardware for the functional devices are directly coupled by means of DMA as described earlier. From the viewpoint of the functional devices 51, therefore, the data is directly exchanged between various units of hardware in a format that conforms to the data buses 43.

Figure 7:
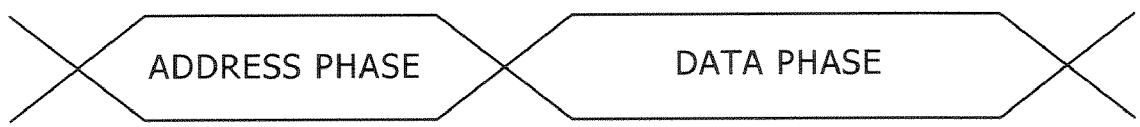
FIG. 7 shows a typical structure of data that is transmitted on a data bus, which is shown in FIG. 4 and other figures.

When, for instance, a format that involves an address phase and data phase as shown in FIG. 7 is employed as a format conforming to the data bus 43, the communication destination can be determined simply by exchanging data formatted as shown in FIG. 7 via the data buses 43 and without exchanging messages via the message bus 42.

As described above, the modules (e.g., controller 11 and modules 12-1 to 12-3 in FIG. 1) to which the present invention is applied are less dependent on a general-purpose bus than before. The modules to which the present invention is applied include the functional device 51 and interface device 52. Only the interface device 52 is dependent on the general-purpose bus (general-purpose system bus 41), and the functional device 51 is not dependent on the general-purpose bus (general-purpose system bus 41).

Therefore, even when the bus to be employed as the general-purpose system bus 41 for the information processing apparatus 1 shown in FIG. 1 is changed due to a change in the trend in the general-purpose bus, the changed bus can be complied with simply by changing (replacing or modifying) the interface device 52. There is no need to change (replace or modify) the functional device 51.

The functional device 51 conforming to the local bus is used as a common module because it can be adapted to various general-purpose interfaces. This provides enhanced product design efficiency.

Further, the information processing apparatus can be configured by directly connecting two or more functional devices 51 without via the general-purpose system bus 41.

Furthermore, the modules are versatile so that IP operations can be performed.

A series of processes described above (or some of such processes) can be performed not only by hardware but also by software.

When the series of processes is to be performed by software, the programs constituting the software are installed from a network or recording medium onto a computer built in dedicated hardware or a general-purpose personal computer or other computer that can execute various functions when various programs are installed.

The recording medium containing the above-mentioned programs is not only a package medium such as a magnetic disk (floppy disk included), an optical disk (CD-ROM (Compact Disk Read Only Memory)), a DVD (Digital Versatile Disk), a magnetooptical disk (MD (Mini-Disk) included), a semiconductor memory, or the like, which records the programs and is distributed separately from the apparatus main body to supply the programs to the user, but also the ROM 72 in FIG. 2, the ROM 82 in FIG. 3, a ROM (not shown) in the interface device 52 in FIG. 4, or a hard disk contained in the storage section 78 in FIG. 2 or in the recording section 85 in FIG. 3, which records the programs and is built in the apparatus main body before being supplied to the user.

The programs recorded on the package medium are read by the SDM 12-3 in FIG. 1 or the like, and installed as needed on the storage section 78 in FIG. 2, the recording section 85 in FIG. 3, or the like.

In this document, the steps that describe the programs recorded on the recording medium not only include processes that are performed in a described chronological order but also include processes that are performed parallelly or individually and not necessarily in chronological order.

In this document, the term "system" denotes the whole apparatus that includes a plurality of processing devices and processing sections.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus comprising:
   one or more modules that are interconnected via a system bus;
   wherein each of one or more said modules includes
      a functional device, which conforms to a local interface that differs from an interface for said system bus, and performs a predetermined function; and
      an interface device, which is connected to said functional device via a local bus conforming to said local interface, and connected to another module via said system bus, wherein,
      when information in a first format conforming to said local interface is supplied from said functional device via said local bus, said interface device converts the information from said first format to a second format conforming to the interface for said system bus and supplies the converted information to said another module via said system bus,
      when information in said second format is supplied from said another module via said system bus, said interface device converts the information from said second format to said first format and supplies the converted information to said functional device via said local bus, and
   said local bus includes a message bus configured to exchange messages with other functional devices, and the message bus is configured to output an interrupt signal to the functional device when a message is received via the message bus and the functional device is configured to perform a read operation at the message bus in response to receiving the interrupt signal.

2. An information processing method for use in an information processing apparatus in which one or more modules are interconnected via a system bus, wherein each of one or more said modules comprises a functional device, which conforms to a local interface that differs from an interface for said system bus, and performs a predetermined function; and an interface device, which is connected to said functional device via a local bus conforming to said local interface, and connected to another module via said system bus, said information processing method comprising:
   when information in a first format conforming to said local interface is supplied from said functional device via said local bus, causing said interface device to convert the information from said first format to a second format conforming to the interface for said system bus and supply the converted information to said another module via said system bus;
   when information in said second format is supplied from said another module via said system bus, causing said interface device to convert the information from said second format to said first format and supply the converted information to said functional device via said local bus, and
   exchanging messages with other functional devices via a message bus included in the local bus by outputting, from the message bus, an interrupt signal to the functional device when a message is received via the message bus and performing, by the functional device, a read operation of the message bus in response to receiving the interrupt signal.

3. A computer-readable recording medium including a program that is used in an information processing apparatus including one or more modules that are interconnected via a system bus and provided each with a functional device, which conforms to a local interface differing from an interface for said system bus and performs a predetermined function, and an interface device, which is connected to said functional device via a local bus conforming to said local interface and connected to another module via said system bus, and is executed by a computer controlling said interface device of each of one or more said modules, said program comprising:
   when information in a first format conforming to said local interface is supplied from said functional device via said local bus, converting the information from said first format to a second format conforming to the interface for said system bus and supplying the converted information to said another module via said system bus;

when information in said second format is supplied from said another module via said system bus, converting the information from said second format to said first format and supplying the converted information to said functional device via said local bus, and exchanging messages with other functional devices via a message bus included in the local bus by outputting, from the message bus, an interrupt signal to the functional device when a message is received via the message bus and performing, by the functional device, a read operation of the message bus in response to receiving the interrupt signal.

4. An information processing apparatus that is connected to a system bus and to a local bus conforming to a local interface, which differs from an interface for said system bus, wherein when information in a first format conforming to said local interface is supplied from said local bus, the information is converted from said first format to a second format conforming to the interface for said system bus and supplied to said system bus, when information in said second format is supplied from said system bus, the information is converted from said second format to said first format and supplied to said local bus, and said local bus includes a message bus configured to exchange messages with other information processing apparatuses, and the message bus is configured to output an interrupt signal to the information processing apparatus when a message is received via the message bus and the information processing apparatus is configured to perform a read operation at the message bus in response to receiving the interrupt signal.

5. The information processing apparatus according to claim 4, comprising:

a storage that is connected to said local bus and configured to store information in said first format; and a converter that is connected to said system bus and configured to convert information format between said first format and said second format.

6. The information processing apparatus according to claim 4, wherein said system bus is a PCI (Peripheral Component Interconnect) Express bus, and wherein said second format is a TLP (Transaction Layer Packet).

7. An information processing method for use in an information processing apparatus that is connected to a system bus and to a local bus conforming to a local interface, which differs from an interface for said system bus, said information processing method comprising:

when information in a first format conforming to said local interface is supplied from said local bus, converting the information from said first format to a second format conforming to the interface for said system bus and supplying the converted information to said system bus;

when information in said second format is supplied from said system bus, converting the information from said second format to said first format and supplying the converted information to said local bus, and exchanging messages with other information processing apparatuses via a message bus included in the local bus by outputting, from the message bus, an interrupt signal to the information processing apparatus when a message is received via the message bus and performing, by the information processing apparatus, a read operation of the message bus in response to receiving the interrupt signal.

8. A computer-readable recording medium including a program that is executed by a computer controlling an information transmission between a system bus and a local bus conforming to a local interface, which differs from an interface for said system bus, said program comprising:

when information in a first format conforming to said local interface is supplied from said local bus, converting the information from said first format to a second format conforming to the interface for said system bus and supplying the converted information to said system bus;

when information in said second format is supplied from said system bus, converting the information from said second format to said first format and supplying the converted information to said local bus, and exchanging messages with other information processing apparatuses via a message bus included in the local bus by outputting, from the message bus, an interrupt signal to the information processing apparatus when a message is received via the message bus and performing, by the information processing apparatus, a read operation of the message bus in response to receiving the interrupt signal.

* * * * *